Dec. 5, 1939.  G. GHERTMAN  2,181,992
PAPER FEEDING DEVICE
Filed May 11, 1938          7 Sheets-Sheet 1

INVENTOR
*Goins Ghertman*
BY
*W. M. Wilson*
ATTORNEY

Dec. 5, 1939.    G. GHERTMAN    2,181,992
PAPER FEEDING DEVICE
Filed May 11, 1938    7 Sheets-Sheet 2

INVENTOR
Goino Ghertman
BY
W. M. Wilson
ATTORNEY

Dec. 5, 1939.　　　　　G. GHERTMAN　　　　　2,181,992
PAPER FEEDING DEVICE
Filed May 11, 1938　　　　7 Sheets-Sheet 3

INVENTOR
Toms Ghertman
BY
W. M. Wilson
ATTORNEY

Dec. 5, 1939.  G. GHERTMAN  2,181,992
PAPER FEEDING DEVICE
Filed May 11, 1938    7 Sheets-Sheet 4

INVENTOR
Goima Ghertman
BY
ATTORNEY

Dec. 5, 1939.  G. GHERTMAN  2,181,992
PAPER FEEDING DEVICE
Filed May 11, 1938  7 Sheets-Sheet 5

INVENTOR
Gino Ghertman
BY
ATTORNEY

Dec. 5, 1939.   G. GHERTMAN   2,181,992
PAPER FEEDING DEVICE
Filed May 11, 1938   7 Sheets-Sheet 6

INVENTOR
Gino Ghertman
BY
W. M. Wilson
ATTORNEY

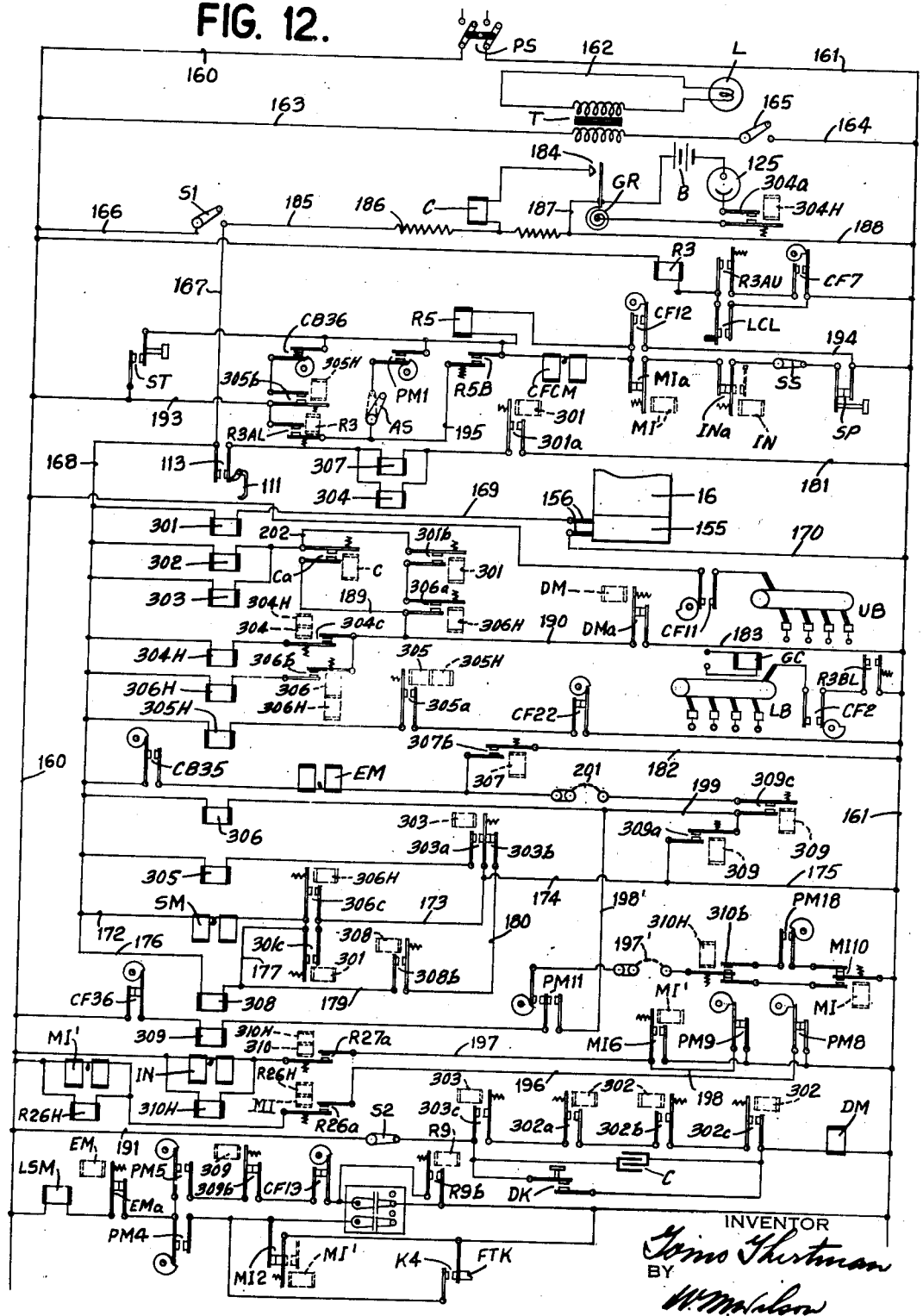

Patented Dec. 5, 1939

2,181,992

UNITED STATES PATENT OFFICE 2,181,992

PAPER FEEDING DEVICE

Goino Ghertman, St. Mande, France, assignor, by mesne assignments, to International Business Machines Corporation, New York, N. Y., a corporation of New York Application May 11, 1938, Serial No. 207,349

14 Claims. (Cl. 197—127)

The present invention relates generally to improvements in paper feeding devices and more specifically to posting feed devices for automatically moving a record sheet to predetermined impression receiving positions.

An object of the invention is to provide devices for automatically feeding a record sheet in position to receive an initial printed impression on the first line below a heading, or to feed the sheet in position to receive a line of item print directly below previously printed lines of items.

Another object of the invention is the provision of means for controlling the posting position of the record sheet by means of the sheet itself. A stripe is marked on the sheet and as successive printing impressions are made line by line down the sheet, the stripe is progressively lengthened towards the bottom of the sheet so that when the sheet is removed and later reinserted to receive further posting entries, the lower end of the stripe serves as a guide to limit the sheet feeding operation.

Another object of the invention is the provision of devices for automatically controlling a sheet striping means so that it is made ineffective while a sheet is being brought up to printing position and while it is being ejected, said striper being made effective only during printing operation.

Another object of the invention is the provision of photocell devices for sensing the length of a stripe on a record sheet and thereby controlling its position; said devices being made ineffective automatically except when the sheet is being brought up to printing position.

A feature of the invention is the provision of means for automatically starting printing operation when the end of a stripe is sensed on a sheet, thus indicating that the sheet is in position to receive printing impressions.

A further object of the invention is the provision of clutching and declutching devices between the driving means and a sheet feeding platen, said clutching and declutching devices being controlled by a galvanometric relay and photocell devices influenced by stripes of differential length on the record sheets being fed thereby.

A still further object of the invention is the provision of means for automatically disabling a sheet striping device after the initiation of a total taking cycle.

Further objects of the instant invention reside in any novel feature of construction or operation or novel combination of parts present in the embodiment of the invention described and shown in the accompanying drawings whether within or without the scope of the appended claims and irrespective of other specific statements as to the scope of the invention contained herein.

In the drawings:

Fig. 12 is a wiring diagram of the electrical controls provided for governing the feeding devices.

Figure 10:
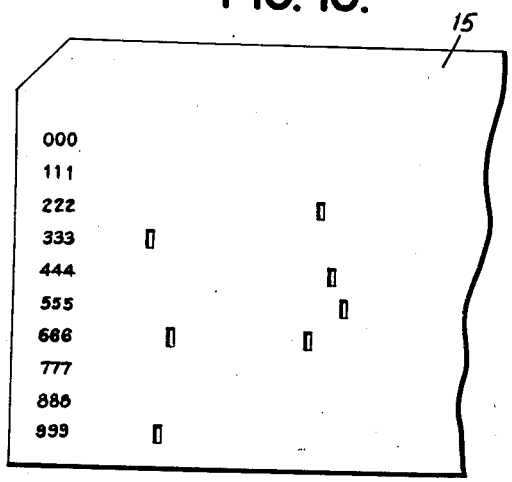
Fig. 10 is a detail view of a portion of a record card used to control the tabulator.

The invention is illustrated in connection with a tabulating machine such as the one disclosed in U. S. Patents 2,042,324 and 2,079,418. Tabulators such as these are controlled by perforated record cards 15, Fig. 10, to print, add, subtract and compute balances and totals of the amounts represented on the cards, in addition to the printing of alphabetical information as set forth in U. S. Patent 2,016,682.

The cards 15 are arranged in groups according to group numbers perforated therein so that a series of related items may be added to compute the total amount of the group. The cards are passed through the machine in succession and automatic group control devices compare the group numbers on consecutive cards so that a group change may be detected. When such a change is detected a total printing operation is initiated and the accumulator is reset.

Figure 5:
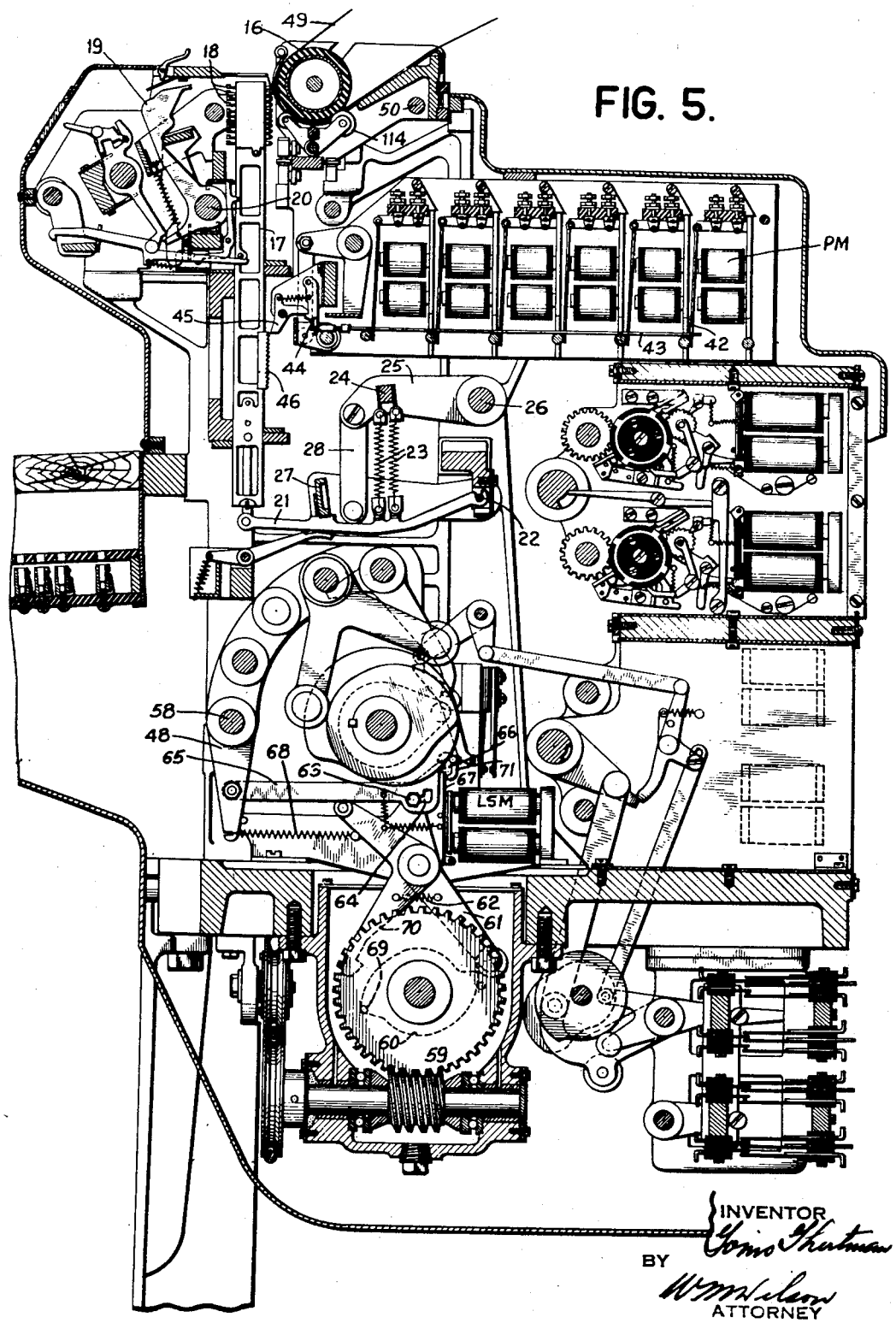
Fig. 5 is a sectional elevation view of the accounting and printing machine to which the present invention is applied.

The printing mechanism is of the form shown in Fig. 5. There it is seen that the printer includes a platen 16, and a series of type carriers 17 each having a plurality of type elements 18 adapted to be struck by a hammer 19 loosely pivoted on a shaft 20. The type carrier is connected at its lower end to an arm 21 fulcrumed at 22. Springs 23 connected to the arms 21 and to a cross beam 24 connected between arms 25 pivoted at 26, tend to lift the arms 21 to raise the type carriers. A restoring bail 27 connected by links 28 to arms 25 is adapted to restore the arms 21 to their lowest or normal position.

Figure 6:
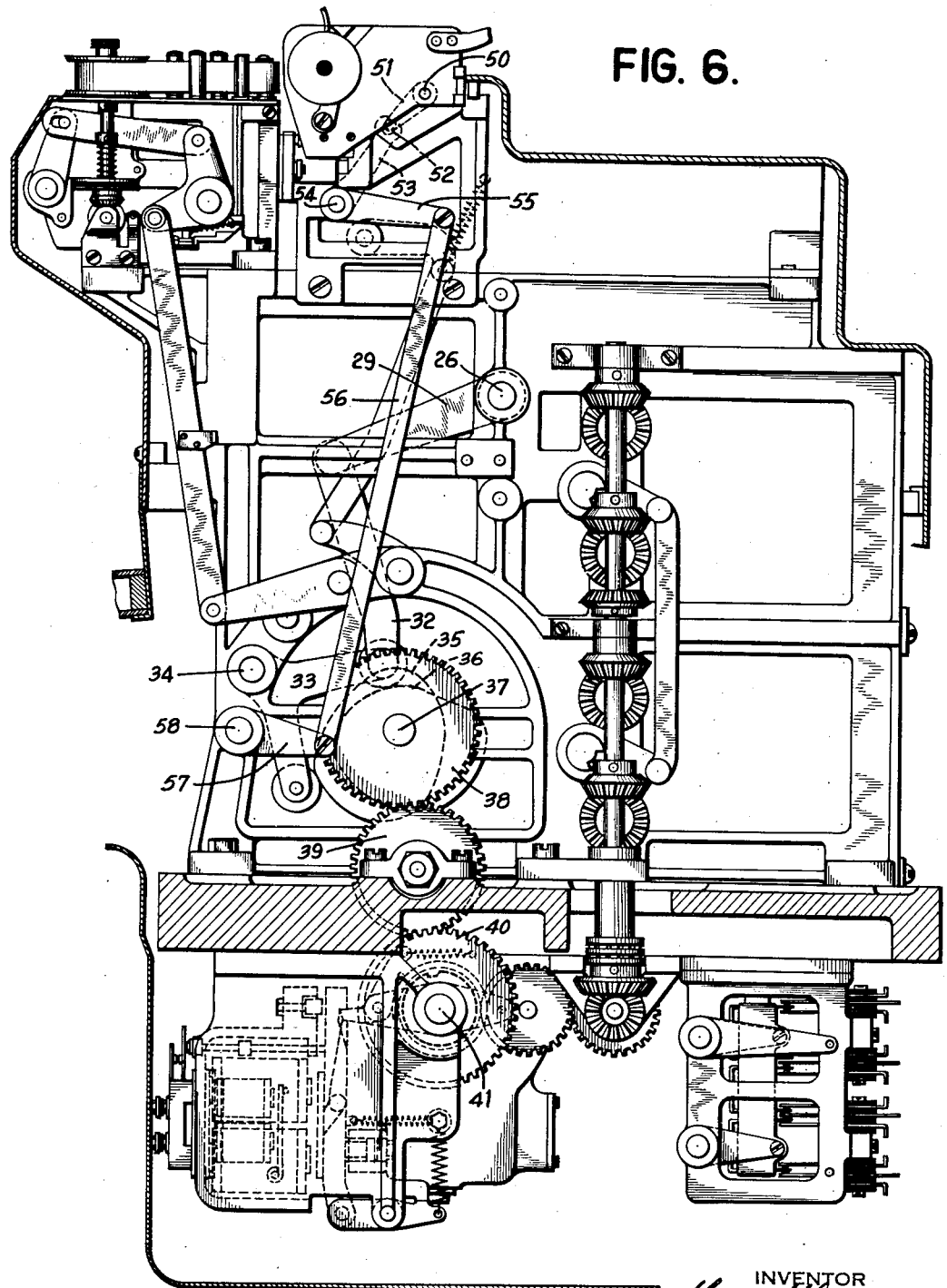
Fig. 6 is a side elevation view of the regular line spacing control devices in the accounting machine.

An arm 29 (Fig. 6) fixed to the shaft 26, on which the arms 25 are also fixed, is connected by a link 32 to a follower arm 33 pivoted at 34 and cooperating with complementary cams 35 and 36 on cam shaft 37.

Shaft 37 is driven through a chain of gears 38, 39, and 40, the latter of which is mounted on a shaft 41. Shaft 41 turns synchronously with the feeding of the cards through the machine and the bail 27 (Fig. 5) is raised to permit the type carriers to rise in synchronism with the feeding of the card. Thus, when the type element 18 carrying the numeral nine is approaching the printing line with respect to platen 16 and the actuating hammer 19, the nine position on the card will be passing the card sensing brushes. If there is a perforation in the card at the nine position, a circuit will be closed through the sensing brush to the printing magnet PM of that particular column. This will attract an associated armature 42 which is connected to one of the rods 43 which at the other end is connected to a latching member 44 of the particular column. This will release a latching pawl 45 permitting it to cooperate with ratchet teeth 46 carried by the type carrier to stop the type carrier with the nine type 18 in line for printing.

Line spacing is carried on in the ordinary manner by devices about to be described. Referring to Fig. 5 it is seen that a record sheet 49 is carried by the platen 16 supported by the paper carriage frame in the usual manner. Platen spacing is effected by the usual pawl and ratchet (not shown) operated from a shaft 50 journaled in the carriage frame. Fixed to shaft 50 is an arm 51 (Fig. 6) carrying a rod 52 cooperating with a bifurcated lever 53 mounted on stud 54. To this stud is secured an arm 55 connecting through a link 56 with an arm 57 on shaft 58. In Fig. 5 it is seen that the constantly running worm wheel 59 has affixed thereto a double cam 60 engaging a lever 61 urged by a spring 62 into contact with said cam. An upwardly extending arm of lever 61 carries a stud 63 which moves in an L-slot 64 of a link 65 connected to an arm 48 on shaft 58. A nose 66 of link 65 rests upon armature 67. Magnet LSM, energized at a time when the follower roller of lever 61 is on the low portion of cam 60 and stud 63 is to the right in slot 64, will permit link 65 to be drawn down into operating relationship with stud 63 so that as lever 61 is rocked counterclockwise, shaft 58 will be actuated to cause spacing of platen 16. A spring 68 restores shaft 58 and the connected links.

Following such paper spacing, a pin 69 in worm wheel 59 coacts with a bell crank 70 to raise link 65 positively out of active engagement with stud 63 and latch it on armature 67. A double armed lever 71 is provided to positively force link 65 down when armature 67 is actuated and in reverse order when link 65 is restored, to positively restore the armature.

When it is desired to feed the record sheet a distance greater than a single line space, other platen driving means are brought into play. These devices are made effective to shift the sheet initially past the preprinted heading and bring it to the first line printing position. They also serve to eject the sheet after a total is printed or after one or more items are listed. The feeding devices including clutching and declutching means interposed between the driving means and the platen, said means being selectively operated to start and stop the feed as explained more fully hereinafter.

Figure 7:
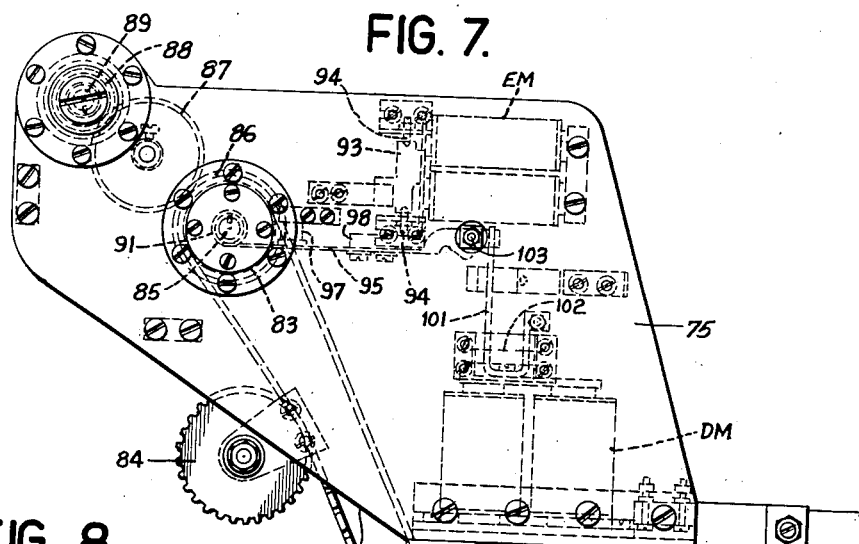
Fig. 7 is a side elevation view of the clutching and declutching devices connected with the paper feed control devices and the paper insertion and ejection control devices.
Figure 8:
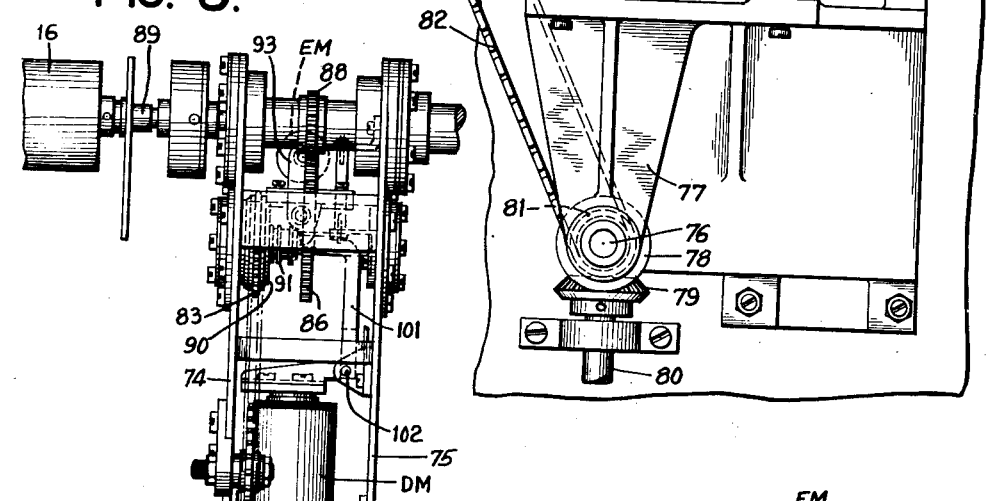
Fig. 8 is a rear elevation view of the feed clutching and declutching devices.

Turning to Fig. 8 it is noted that the feeding controls are mounted between a pair of side frames 74 and 75 fixed to the tabulator frame. A short transmission shaft 76 is suspended in a bracket 77 attached to the tabulator. Fastened to one end of shaft 76 is a bevel gear 78 meshing with another bevel gear 79 which is fastened to the constantly rotating vertical shaft 80 of the tabulator. Also attached to shaft 76 is a sprocket 81 for driving a chain belt 82 that is wrapped around another sprocket 83 in driving engagement therewith. The chain is maintained taut by an adjustable idler sprocket 84 (Fig. 7) pressed against the left side.

Figure 9:
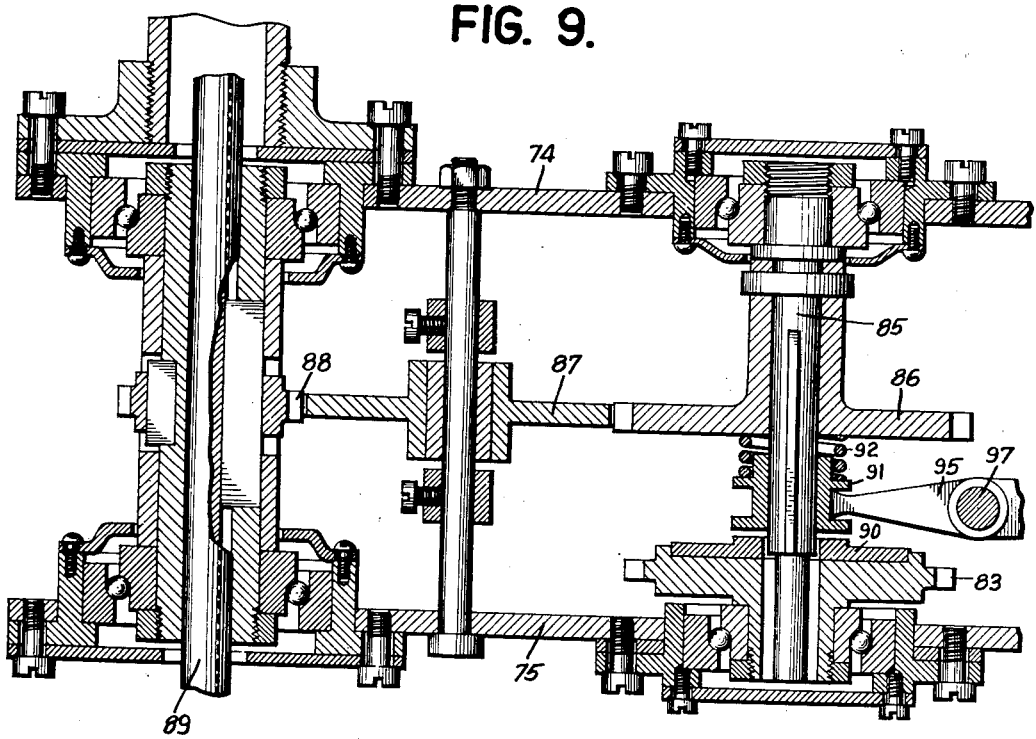
Fig. 9 is a bottom sectional view of the clutching and declutching devices.

Sprocket wheel 83 (Fig. 9) is loosely mounted on a shaft 85 which is keyed to a feeding drive gear 86. The sprocket 83 may be connected to the drive gear 86, an idler gear 87 and a pinion 88 on the platen shaft 89, through a friction clutch comprising a friction disk 90 which is fastened on the sprocket 83 and a slidable keyed sleeve 91 which may be pressed against disk 90 by spring 92 or moved away therefrom by electric controls about to be described.

It is apparent from the foregoing that when clutch 90—91 is engaged, paper feed platen shaft 89 is driven during either listing or total taking cycles. In other words, platen 16 (Fig. 8) rotates through connections to shaft 80 each time clutch 90—91 is in engagement.

An engaging electromagnet EM (Fig. 7) makes it possible, by means of an associated armature 93 pivoting on points 94, to control engaging sleeve 91 by a lever 95 arranged to bring it against disk 90 to determine clutch engagement. Magnet EM trips the latch connections (Fig. 7a) which normally hold lever 95 and sleeve 91 (Fig. 9) out of clutching relationship, against the tension of spring 92. Lever 95 has an end 96 (Fig. 7a) which fits into a groove in sleeve 91, and it pivots on a vertical stud 97 (Fig. 7) so that a block 98 thereon is in the path of a depending finger 99 on armature 93. When the armature is attracted, finger 99 moves to the right (Fig. 7a) out of the path of block 98 and thereby releases lever 95 (Fig. 9) so that it may be rocked in a counter-clockwise direction by spring 92 to press sleeve 91 against disk 90 in driving relationship.

Figure 7A:
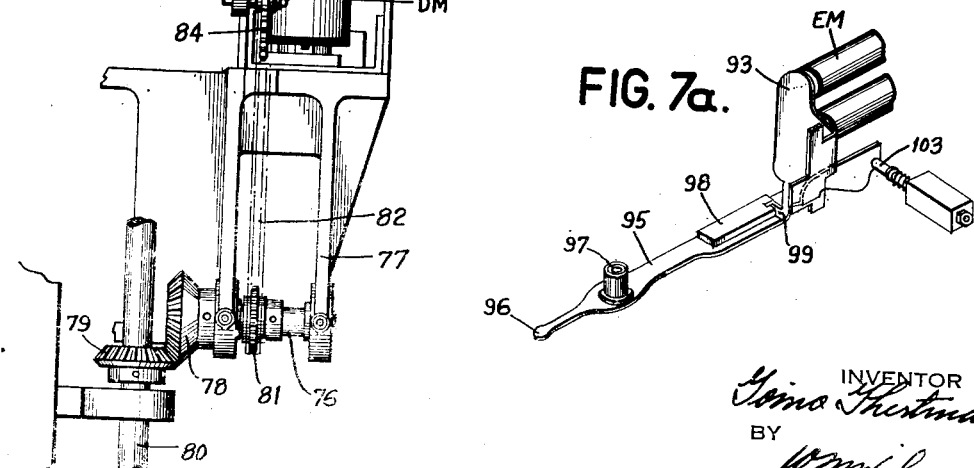
Fig. 7a is a detail view of an armature latch and clutch control lever associated with the feed clutching magnet.

A disengaging electromagnet DM (Figs. 7 and 8) operates in an opposite way through an armature lever 101 cooperating with lever 95 to shift sleeve 91 and compress spring 92 and relatch lever 95 and block 98 behind armature finger 99 and thus stop the rotation of platen 16 and the feed of the paper strip. Lever 101 pivots on a rod 102 and carries an adjustable projection 103 cooperating with the end of lever 95 so that the lever may be rocked in a clockwise direction (Fig. 9) and relatched as shown in Fig. 7a.

The devices for controlling the energization of magnets EM and DM which make it possible to engage or disengage the clutch for controlling the platen drive are described hereinafter.

The foregoing sections of the disclosure dealing with the card sensing devices, printing mechanisms, line spacing controls and sheet feeding devices are related generally to the usual form of tabulating mechanism. The sections of the specification about to be presented relate in the main to the novel features of the present invention.

Figure 1:
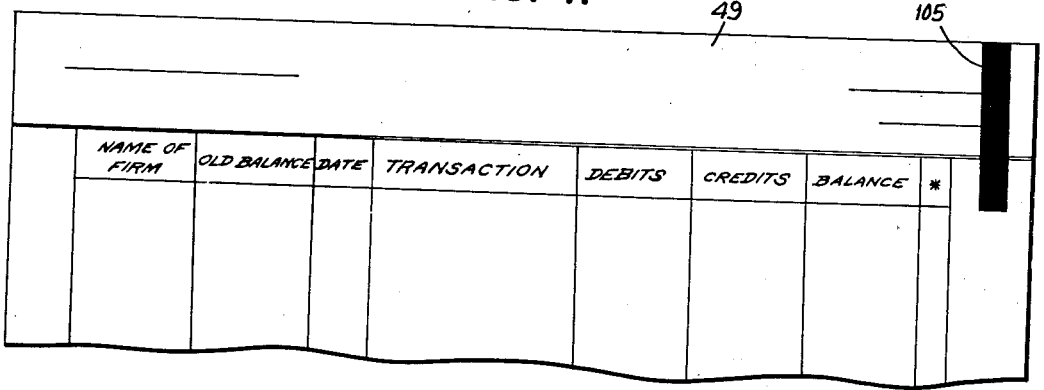
Fig. 1 is a view of a sample record sheet shown before receiving printing impressions. The right margin is marked with a stripe of such length that the feeding devices are controlled to bring the sheet in position to receive the first line of print.
Figure 2:
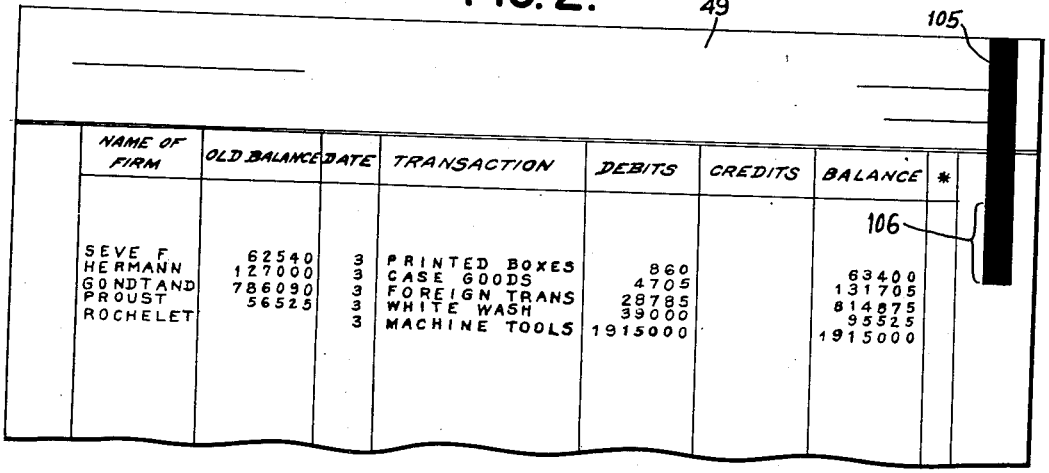
Fig. 2 is a view showing a sample sheet which has received five lines of print and the stripe thereon is extended to control the feeding devices to bring the sheet in position to receive the sixth line of print when it is reinserted in the printing machine.
Figure 11:
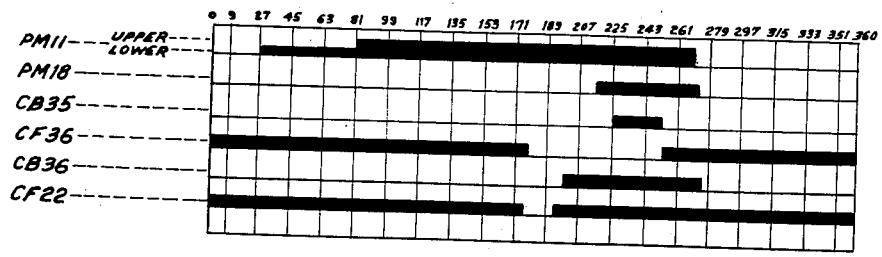
Fig. 11 is a timing chart showing the operation time of the new cam contacts.

In Fig. 1 is shown the ledger record sheet 49 with a preprinted stripe 105 that is sensed by photocell devices which control the sheet feeding operation. The length of the stripe determines the duration or extent of the feeding operation. The preprinted portion 105 of the stripe determines the length of the initial feed operation and the placement of the first line of print, as shown in Fig. 2. As a plurality of items are printed, the sheet 49 is line spaced and the stripe is extended towards the bottom of the sheet by a striping means in the tabulator. As five lines of print are made, the stripe is extended by the amount 106, Fig. 2, so that if the sheet is removed and reinserted, the photocell devices sensing the lengthened stripe will control the feed to stop the sheet in the sixth line position to receive a line of print directly under the five existing lines of print.

As an alternative method of controlling the initial feed of the ledger sheet, the sheet may be inserted by hand up to the desired first line position without the use of a preprinted portion of the stripe. During such hand feeding, the tabulator striping means would mark a top portion of stripe 105 to control all subsequent automatic posting reinsertions of the sheet.

Figures 3, 4:
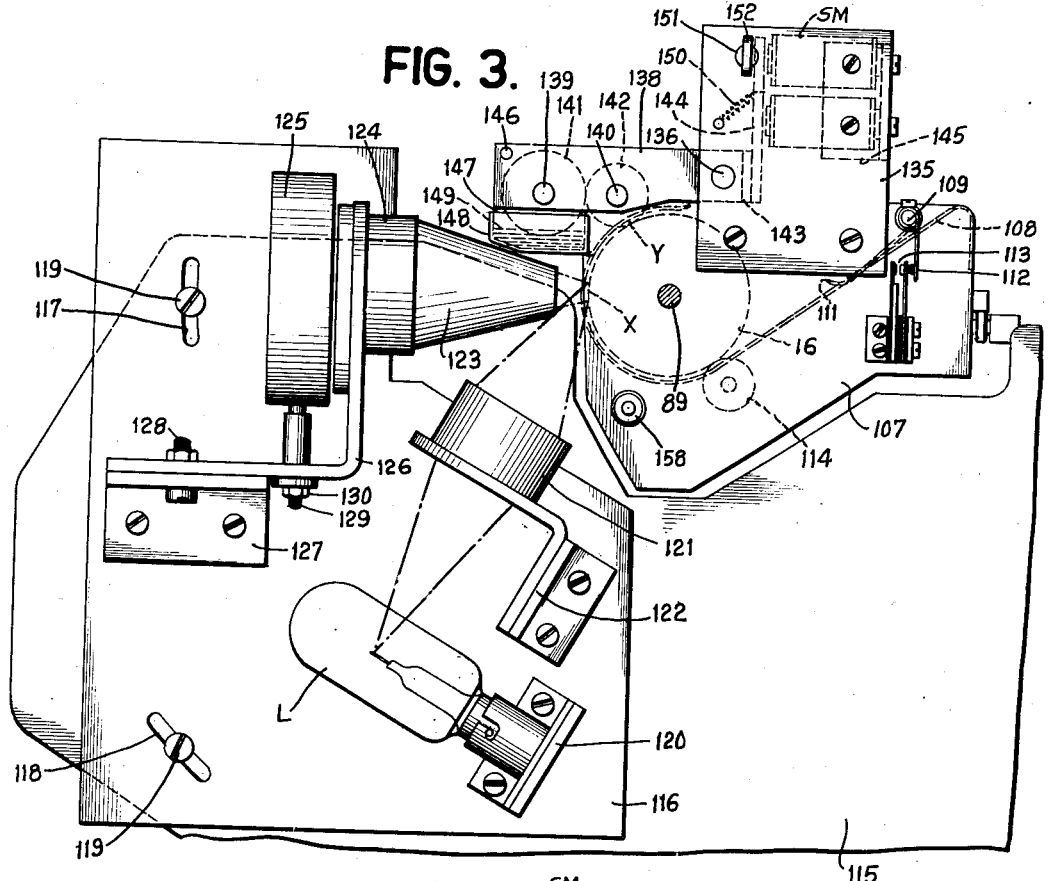
Fig. 3 is a side elevation view showing the photocell sensing devices and the stripe marking roller.
Fig. 4 is a front elevation view of the platen showing the stripe roller and the brushes for sensing the passage of the end of a sheet.

Referring to Fig. 3 it is seen that the platen 16 and platen shaft 89 are supported at the right end in a carriage side frame 107 to which is attached a paper guide 108 that slopes down under the platen and up around the front to hold the record sheet in contact with the platen. The top of the sheet 49 is placed in the machine under a rod 109 loosely pivoted in frame 107. Attached to rod 109 inside the carriage frames is a feeler finger 111 the end of which normally rests in an opening in the guide 108. Fixed to the portion of rod 109 extending outside the frame 107 is an arm 112 which has an insulated tip bearing against a contact blade of a pair of contacts 113. When the leading edge of the sheet is placed between feeler 111 and guide 108 and forced down into engagement with feed roller 114, the feeler finger is raised by the sheet and rod 109 is rocked in a clockwise direction. Then the arm 112 thereon closes contacts 113 to initiate a sheet feeding and sensing operation as explained more fully with reference to the wiring diagram.

Attached to the main right side frame 115 is an adjustable plate 116 carrying the photo-cell sensing devices. The plate is slotted at 117 and 118 with curved slots that adapt it for radial adjustment with respect to the platen. Screws 119 hold the plate fast to the main frame. A bracket 120 on plate 116 holds a lamp L which emits light rays that are concentrated by a lens 121 mounted in a support 122 fixed to plate 116. The light rays are directed on the periphery of platen 16 at a point over which moves the stripe 105. When the darkened stripe passes the light is not reflected and the feed continues until the end of the stripe is sensed. Then the light rays are reflected from the surface of the paper and directed back through a shade 123 and lens 124 and into a photo-electric cell 125 which stops the feeding operation to initiate printing and line spacing. The lens 124 is mounted on an angle iron 126 which is adjustably mounted on a fixed bracket 127 by means of a bolt 128 which passes through a slot in 126. The photocell unit 125 is adjustably held on the horizontal leg of angle 126 by means of a shouldered screw 129 passing through a slot and held by a nut 130 and a washer.

The point X at which the light rays are reflected to detect the passage of the end of stripe 105, may be varied by means of the sensing unit adjustments provided by slots 117, 118, bolt 128 and screw 129. A cover is held over the photocell unit to shield it from light other than that emitted by lamp L.

Attached to the right carriage frame 107 (Fig. 3) is a plate 135 carrying the striping marker devices. Loosely pivoted on a stud 136 projecting from plate 135 is a U-shaped frame with a pair of arms 137 and 138 (Fig. 4) between which two shafts 139 and 140 are mounted to carry an inking roller 141 and a striping roller 142. Fixed to the crossbar 143 (Fig. 3) of the marker frame is an armature bar 144 extending up in front of a striping control magnet SM secured to a bracket 145 attached to plate 135.

The ends of arms 137, 138 are held properly spaced by a rod 146 riveted in the marker frame. Secured to a downwardly extending portion 147 of arm 137 is a well 148 for holding a supply of ink 149 into which extends the roller 141. A spring 150 tends to hold the striping frame rocked counterclockwise (Fig. 3) with striping roller 142 in contact with the platen 16, but normally this is prevented by magnet SM which is energized to attract bar 144 and rock the frame in a clockwise direction to lift the roller 142 above the platen so that the record sheet may be fed therebetween before the magnet is deenergized to drop the roller on the paper.

The top of the armature bar 144 cooperates with a variable limiting stop in the form of a rod 151 extending from plate 135 and frictionally secured thereto but adjustable radially by means of a thumb piece 152. The edge of rod 151 against which the armature 144 strikes is flattened to form a cam surface whereby the armature may be positioned clockwise to vary the pressure and position of the roller 142 with respect to the record sheet.

As the sheet is spaced for the entry of item after item, roller 142 turns to mark a stripe 105, 106 (Fig. 2) that continues towards the bottom of the sheet as long as items are printed. Roller 141 is frictionally driven by roller 142 and thereby carries the ink up out of the well 148 and deposits it on the roller 142 to prepare the roller for subsequent striping operation. The magnet SM is automatically energized before a sheet is ejected, so that the striping roller is lifted out of printing position as a sheet passes out and another sheet is fed in.

As the end of the stripe 105 on an inserted sheet 49 passes the point X, Fig. 3, the photocell devices initiate operation of the sheet feed declutching devices to stop the feeding operation. The effect of this control is not instantaneous, therefore the end of the stripe does not stop directly above X, instead it is carried to the point Y under the striping roller 142 from which position the stripe may be lengthened as items are printed. The photocell devices are adjustably positioned to place the focusing point X in such a position with respect to the distance between X and Y, that the end of the stripe always stops at the point Y in readiness for further posting entries and continuation of the posting control stripe.

Passage of the end of the sheet away from the platen is sensed and used to control declutching of the feeding means. For this purpose the right end of the platen 16, Fig. 4, is provided with a conducting ring 155 upon which rest a pair of sensing brushes 156 mounted in an insulated holder 157 fixed to the carriage frame 107 by a nut 158. The record sheet 49 separates the brushes 156 from the ring 155 while printing takes place and during ejection. However, at the end of the sheet ejection operation, the lower edge of the sheet passes above the brushes, allowing them to touch the ring and initiate operation of the feed declutching magnet DM as explained further with reference to the wiring diagram.

In the wiring diagram, Fig. 12, there are shown only those connections necessary for the functioning of the various devices described in detail in this specification. It is understood that the machine in which the devices are incorporated may have all the usual controls such as those shown in Patent 2,079,418 and the other patents already mentioned.

The main lines 160 and 161 are connected to the power source by the main switch PS.

The lamp L is connected by wire 162 in series with one winding of a transformer T. The other winding of the same transformer is connected across the main lines by wires 163, 164; and a switch 165 in series therewith, is closed when the lamp is to be lighted for ledger posting feed control.

A posting control switch S1 is closed whenever automatic sheet insertion and ejection is desired.

As soon as switch S1 is closed, a circuit is completed through a control relay 301 which is in series with the paper sensing brushes 156 (Fig. 4) initially resting directly on the conducting band 155. Then a circuit is completed through line 160 (Fig. 12), wire 166, switch S1, wires 167 and 168, relay 301, wire 169 to one brush 156, band 155, the other brush 156 and wire 170 to line 161.

Relay 301 then operates contacts 301a, 301b and 301c to prepare connections for various parts of the feeding and striping control. Contacts 301c, when closed, complete a circuit through the striping control magnet SM and an associated holding relay 308. The circuit through magnet SM may be traced from line 160, through wire 166, switch S1, wires 167, 168 and 172, magnet SM, contacts 301c, and wires 173, 174 and 175 to line 161. At the same time, relay 308 is energized through wires 176 and 177 connected in parallel with magnet SM. Relay 308 then closes contacts 308b to establish a holding circuit for itself and magnet SM. The circuit through relay 308 includes line 160, wire 166, switch S1, wires 167, 168 and 176, relay 308, wire 179, contacts 308b, wire 180, contacts 303b, wires 174, 175 and line 161. Magnet SM is held energized by wires 172 and 177 connecting it in parallel with relay 308. By means of these connections, magnet SM (Fig. 3) is made effective to elevate the inking roller 142 so that striping is not performed until a sheet is fed automatically to the proper position, at which time contacts 303b (Fig. 12) are opened to deenergize magnet SM so that the inking roller descends to start striping the record sheet 49 as explained more fully hereinafter.

When a sheet is placed on table 108 (Fig. 3) and directed under lever 111 to lift it and close contacts 113, Fig. 12, a circuit is completed through control relays 304 and 307, because at the time contacts 301a are also closed. The circuit runs through line 160, wire 166, switch S1, wire 167, lever contacts 113, relays 304 and 307, contacts 301a, wire 181 and line 161.

The energized relay 307 then acts to close associated contacts 307b in series with the feed clutch engaging magnet EM. When the cam contacts CB35 are closed, an impulse is directed through magnet EM over the connections; line 160, wire 166, switch S1, wires 167, 168, cam contacts CB35, magnet EM, contacts 307b, wire 182 and line 161. Magnet EM then acts, Fig. 7a, to free lever 95 so that clutch 90, 91, Fig. 8, is connected to rotate the platen 16 and feed the record sheet 49.

As soon as sheet feeding is initiated, the photocell sensing devices are also called into action by relay 304. This relay closes contacts 304c to complete a circuit through an associated holding coil 304H which then remains energized until a pair of contacts DMa are opened when the sheet feed is declutched. The circuit through the holding coil includes line 160, wire 166, switch S1, wires 167, 168, holding coil 304H, contacts 304c, contacts DMa, wire 183 and line 161. Coil 304H then closes the contacts 304a in series with the sensitive elements of the photocell 125, making it and the attached galvanometric relay GR responsive to any light from lamp L that is reflected off the sheet 49 at the point X, Fig. 3.

As the sheet is fed, it passes between brushes 156, Fig. 4, and band 155 to insulate the brushes and break the circuit which has been passing through relay magnet 301. Contacts 301a and 301c are opened by the deenergization of relay 301, but even though magnets 304 and 307 are thus deenergized, contacts 304a are held closed by coil 304H and sheet feeding continues after contacts 307b are opened. Energization of the stripe roller lifting magnet SM is also sustained by contacts 308b after contacts 301c are opened.

The darkened stripe 105, Fig. 2, passes in the inspection field of the optical system as the sheet continues to move. Photocell 125, Fig. 12, and relay GR adjusted so that the galvanometric relay is not effective as long as the black stripe is inspected. However as soon as the bottom end of the stripe passes the point X, Fig. 3, the light from lamp L is reflected from an unmarked part of the border of sheet 49. Then the photocell 125, Fig. 12, is affected and the current through the galvanometer coil is reinforced. The light sensing circuit includes a battery B, the special coil of relay GR, contacts 304a and photocell 125. The coil then moves to close galvanometer contacts 184 which are in series with a relay C. This relay is energized by means of a circuit through line 160, wire 166, switch S1, wire 185, resistance 186, relay C, contacts 184, wires 187, 188 and line 161.

Relay C then acts to close contacts Ca and energize relays 302 and 303 for causing operation of declutching magnet DM. The circuit through the relays may be traced from line 160, through wire 166, switch S1, wires 167, 168, relays 302, 303, contacts Ca, wires 189, 190, contacts DMa and wire 183 to line 161. Relays 302 and 303 are effective to close contacts 302a, 302b, 302c and 303c, which are in series with the declutching magnet DM. The declutching circuit is made up with line 160, wire 191, switch S2, contacts 303c, 302a, 302b and 302c, magnet DM and line 161. A condenser C prevents sparking across the contacts. Declutching key DK may be operated at any time to energize magnet DM and stop the sheet feeding operation. Referring to Figs. 7 and 8 it is seen that magnet DM operates lever 101 to restore lever 95 and declutch the driving connections to the platen.

Magnet DM also acts to open contacts DMa, breaking the circuit through relays 304H, 302 and 303. Relay 304H then allows contacts 304a to open to deenergize the photocell circuit which, in turn, causes contacts 184 to open, deenergizing relay C. Contacts Ca are then opened to prevent an immediate reenergization of relays 302 and 303 when contacts DMa close.

At the same time that relay 303 is effective to stop sheet feeding, it is also effective to call the striping mechanism into operation. This is done by opening contacts 303b to deenergize the striping magnet SM so that the inking roller 142, Fig. 3, may fall on the record sheet to start marking at the point Y which coincides with the end of previously marked portion of the stripe. This distance between X and Y is the measure of the overthrow, or continued motion of the platen in the interval between the time that the end of the stripe is sensed and the time that declutching is effected. The light focusing point X may be shifted by adjusting the photocell frame. This provides means for bringing the point Y directly under the inking roller.

Relay 303 is also effective to initiate automatic starting of the card feeding and printing operations of the tabulator. When contacts 303a are closed, an impulse is sent through relay 305 along a circuit path including line 160, wire 166, switch S1, wires 167, 168, relay 305, contacts 303a, wires 174, 175 and line 161. Relay 305 then closes contacts 305a to energize a holding coil 305H as long as cam contacts CF22 remain closed. The circuit passes through the left side of the line in the usual way, and thence through coil 305H, contacts 305a and cam contacts CF22 to line 161. Then the holding coil 305H closes contacts 305b arranged in a shunt around the tabulator start key contacts ST. Contacts CB36 and CF12 close to energize the control relay R5 through a circuit with line 160, wire 193, contacts 305b, cam contacts CB36, relay R5, contacts CF12, wire 194 and line 161. Relay R5 then closes contacts R5b to energize the card feed clutch magnet CFCM through connections including line 160, wire 193, contacts R3AL (closed by relay R3 which is energized by the closure of contacts LCL as soon as cards are under the lower brushes), wire 195, contacts R5b, magnet CFCM, contacts MIa and INa, switch SS, stop key contacts SP and line 161. The machine operates to analyze the cards, print the items on the record sheet and compare the group numbers on successive cards to detect a group change in the usual way.

During operation of the tabulator, the sheet posting and ejection control devices are inactive, the sheet being line spaced by the regular line spacing controls including magnet LSM. Contacts EMa and 309b are placed in series with line space magnet LSM to prevent simultaneous operation of both sheet spacing systems. Whenever engaging magnet EM is active in clutching the platen to the driving means, it is also effective to open contacts EMa to prevent line spacing. Upon the occurrence of a group change and the initiation of a total printing cycle, relay 309 is made effective to open contacts 309b and prevent line spacing while the total is printed and the sheet is ejected.

Relay magnet 309 is energized by the occurrence of a minor or intermediate group change. Either the minor pickup coil MI or the intermediate coil 310 is energized by the usual group control card comparing devices. The electrical controls through which the minor control coil MI is made effective by a group change, are set forth in detail in the copending application, Serial No. 18,145, filed April 25, 1935, by E. J. Rabenda. Coil MI, when energized, closes contacts R26a and makes minor control magnet MI' and the associated holding coil R26H effective through a circuit embracing line 160, magnets MI' and R26H, contacts R26a, wire 196, contacts PM8 and line 161. Intermediate coil 310, when made effective, acts to close contacts R27a and energize intermediate magnet IN and the related holding coil 310H by a circuit including line 160, magnets IN and 310H, contacts R27a, wires 197, 198, contacts PM9 and line 161.

If a minor group total is printed, magnet MI' closes the lower contacts MI10 and relay 309 is energized through the closed contacts CF36 and by the closure of contacts PM11 operated in the total cycle. The circuit includes line 160, contacts CF36 which remain closed during the suspension of card feeding, relay 309, left contacts PM11, plug connection 197', lower contacts 310b, lower contacts MI10 and line 161. An intermediate change causes relay 310H to close the upper contacts 310b and then relay 309 is energized by means of line 160, contacts CF36, relay 309, left contacts PM11, plug connection 197', upper contacts 310b, contacts PM18 closed after the first half of the total cycle, upper contacts MI10 and line 161.

Relay 309 closes contacts 309a to set up a holding circuit for itself and an initiating circuit for relay 306. It also closes contacts 309c to prepare for the energization of the clutch engaging magnet EM to eject the sheet. The holding circuit comprises line 160, contacts CF36, relay 309, right contacts PM11 closed soon after the left contacts, wires 198', 199, contacts 309a, wire 175 and line 161. Relay 306 is then picked up through line 160, wire 166, switch S1, wires 167, 168, relay 306, wire 199, contacts 309a, wire 175 and line 161. Contacts 306b are closed by relay 306 to energize an associated holding coil 306H through line 160, wire 166, switch S1, wires 167, 168, coil 306H, contacts 306b, wire 190, contacts DMa, wire 183 and line 161. Relay coil 306H then closes contacts 306a to prepare part of the connections for relays 302 and 303 so they may be effective to initiate operation of the feed declutching magnet DM after the record sheet has been ejected. Coil 306H also closes contacts 306c to energize the ink roller lifting magnet SM while the sheet is being ejected. The circuit follows a path through line 160, wire 166, switch S1, wires 167, 168, 172, magnet SM, contacts 306c, wires 173, 174, 175, and line 161.

Returning to consideration of the means for ejecting the record sheet after total printing; upon closure of contacts 309c by relay 309 and subsequent closure of cam contacts CB35, clutch engaging eject magnet EM is energized by electrical connections comprising line 160, wire 166, switch S1, wires 167, 168, contacts CB35, magnet EM, plug connection 201, contacts 309c and 309a, wire 175 and line 161. Operation of magnet EM is effective to engage the platen with the driving clutch so that the record sheet is ejected. Such ejection after a card group change and total printing may be prevented by disengaging plug connection wires 197' and 201. Ejection before total printing may be secured by establishing series connections through the plug wires 197' and 201.

After the record sheet is ejected, rotation of the platen is stopped automatically by energization of the declutching magnet DM. This is initiated by the contact of the brushes 156 on the band 155 as the end of the ejected record sheet ascends the front of the platen. Since relay 301 is in series with brushes 156, it is energized and associated contacts 301b are closed. With contacts 306a already closed as explained hereinfore, closure of contacts 301b causes energization of control relays 302 and 303 through a circuit including line 160, wire 166, switch S1, wires 167 and 168, relays 302 and 303, wire 202, contacts 301b and 306a, wire 190, contacts DMa, wire 103 and line 161. Relays 302 and 303 then close the contacts 302a, 302b, 302c and 303b in series with the declutching magnet DM. This magnet then operates the driving clutch to stop the movement of the platen after the sheet has been ejected.

It is pointed out hereinbefore that the inking roller lifting magnet SM is energized by the closure of contacts 306c. Before relay 306 is deenergized at the end of the cycle and contacts 306c open, magnet SM is sustained in an active condition by the closure of contacts 301c. This serves to hold the striping roller away from the platen, not only during ejection, but until a newly inserted sheet is fed to a position to resume recording.

Magnet DM operates contacts DMa to deenergize relays 302, 303 and 304H and 306H so that the controls are restored in readiness for a new feeding operation. The auto start switch AS is opened when operating with ledger posting feed control. This is done to cause the tabulator to stop at every change of card groups so that a new ledger sheet may be inserted manually.

While there is shown and described the fundamental novel features of the invention as applied to the disclosed illustrative embodiment, it will be understood that various omissions, substitutions and changes in the form and details of the device and its operation may be made by those skilled in the art without departing from the spirit of the invention. It is the intention therefore to be limited only as indicated by the scope of the following claims.

What is claimed is:

1. In a machine for feeding a record sheet, sheet feeding rollers, a driving means for said rollers, a clutch for connecting said driving means to the feed rollers, means for engaging said clutch, means for disengaging said clutch, normally ineffective means for marking a stripe on said sheet and extending said stripe each time the machine is operated, photocell devices for sensing the length of said stripe, sheet inserting means for operating said engaging means and said photocell devices, and sheet positioning means controlled by said photocell devices for operating said disengaging means and making said marking means effective when the end of said stripe is sensed.

2. In a machine for feeding a record sheet, sheet feeding rollers, a driving means for said rollers, a clutch for connecting said driving means to the feed rollers, means for engaging said clutch, means for disengaging said clutch, normally ineffective means for marking a stripe on said sheet and extending said stripe each time the machine is operated, photocell devices for sensing the length of said stripe, sheet inserting means for operating said engaging means and said photocell devices, and sheet positioning means controlled by said photocell devices for operating said disengaging means and making said marking means effective when the end of said stripe is sensed, and sheet ejecting means for making said marking means ineffective and operating said engaging means to feed the sheet out of said rollers.

3. In a machine for feeding a record sheet, sheet feeding rollers, a driving means for said rollers, a clutch for connecting said driving means to the feed rollers, means for engaging said clutch, means for disengaging said clutch, normally ineffective means for marking a stripe on said sheet and extending said stripe each time the machine is operated, photocell devices for sensing the length of said stripe, sheet inserting means for operating said engaging means and said photocell devices, and sheet positioning means controlled by said photocell devices for operating said disengaging means and making said marking means effective when the end of said stripe is sensed, and sheet ejecting means for making said marking means ineffective and operating said engaging means to feed the sheet out of said rollers and means rendered operative by the passage of said sheet out of said rollers for operating said clutch disengaging means.

4. In a machine for feeding a record sheet, sheet feeding rollers, means for detecting the presence of a sheet near said rollers, a driving means for said rollers, means for engaging the driving means with said rollers, means for disengaging said driving means from said rollers, means for marking said sheet according to the extent to which it is fed, normally ineffective photoelectric devices for sensing the sheet marking, means under control of said detecting means for operating said engaging means and said photoelectric devices, and means under control of said photo-electric devices for operating said disengaging means and said marking means when the end of a previously printed mark is sensed.

5. In a machine for feeding and printing a ledger sheet under control of record cards arranged in groups, a platen around which said sheet is fed, means for feeding said cards, means for sensing data on said cards, means for line spacing said platen, means for marking on said sheet a stripe which is lengthened as the sheet is spaced, a driving means, a clutch between said driving means and the platen, a clutch engaging means, a clutch disengaging means, photocell devices for sensing the length of the stripe on said sheet, means for detecting the presence of a sheet at said platen, means under control of said detecting means for operating said engaging means and making said photocell devices effective, sheet insertion control means under control of said photocell devices for operating said disengaging means, making said marking means effective and initiating operation of said card feeding means, item and total printing means controlled by said card sensing means, group control devices for sensing a change in card groups and thereby initiating a total printing operation, sheet ejection control means under control of said group control devices for operating said clutch engaging means, disabling card feeding, and making said marking means ineffective after total printing, means for detecting the passage of the ejected sheet away from the platen, and means under control of said passage detecting means for operating said clutch disengaging means and sustaining the ineffective condition of said marking means.

6. In a machine for feeding a striped record sheet, sheet feeding means, photocell devices for sensing the length of the stripe on said sheet, marking means for extending the stripe, and means under control of said photocell devices for stopping said feeding means and operating said marking means when the end of the stripe is sensed.

7. In a machine for feeding a striped record sheet, sheet feeding means, photocell devices for sensing the length of the stripe on said sheet, means for detecting the presence of a sheet, means under control of said detecting means for operating said feeding means and said photocell devices, marking means for extending said stripe, and means under control of said photocell devices for stopping said feeding means and operating said marking means when the end of the stripe is sensed.

8. In a machine for feeding a striped record sheet, sheet feeding means, photocell devices for sensing the length of the stripe on said sheet, means for detecting the presence of a sheet, means under control of said detecting means for operating said feeding means and said photocell devices, marking means for extending said stripe, and means under control of said photocell devices for stopping said feeding means and operating said marking means when the end of the stripe is sensed, means for making said marking means ineffective and operating said feeding means to eject the sheet, and means operable as an incident to the ejection of said sheet for stopping said feeding means.

9. In a machine for printing grouped items on striped ledger sheets, item printing means, line spacing means, sheet feeding means, photocell devices for sensing the length of the stripe on a sheet, marking means for extending said stripe on each line spacing operation, means under control of said photocell devices for stopping said feeding means and conditioning said item printing, line spacing and marking means for operation when the end of the stripe is sensed, and means operable as an incident to the printing of the last item of a group for making said marking means ineffective and operating said feeding means to eject the sheet.

10. In a machine for printing items intermittently on a ledger sheet which is inserted automatically in position to receive printing impressions directly under previously printed items, item printing means, line spacing means, sheet feeding devices, a well containing ink, an inking roller in said well, a striping roller in contact with said inking roller, an armature on which said well and rollers are attached, a magnet which when energized operates said armature to lift the striping roller away from the sheet, normally closed contacts in series with said magnet, photocell devices for sensing the length of a previously printed stripe during insertion of the sheet, means under control of said photocell devices for stopping said feeding means when the end of the stripe is sensed and opening said contacts to deenergize said magnet and drop said striping roller on the sheet, means for adjusting the pressure of said striping roller on said sheet, means under control of said photocell devices for initiating operation of said item printing and line spacing means, and means operable as an incident to the last item printing operation for again closing said contacts to lift said striping roller away from the sheet and initiating operation of said feeding means to eject the sheet.

11. In a machine for printing and feeding a record sheet, printing devices, line spacing means, line spacing means for inserting and ejecting the sheet, a container for a marking substance, a striping roller on said container, means for conveying the substance to the roller, a pivoted armature on which said container is attached, a magnet for rocking the armature to move said roller away from said sheet, contacts in series with said magnet, and means for closing said contacts to energize said magnet to make the striping roller ineffective when the long spacing means is effective, said means also closing said contacts to deenergize said magnet to make the striping roller effective when the line spacing means is operated.

12. In a machine for printing and feeding a record sheet, a platen on which said sheet is fed, means for line spacing said platen, means for rotating said platen to insert and eject the record sheet, a lever pivoted near said platen, a striping roller on said lever in a position to contact with the border of said sheet, means for operating said lever to press said roller on the sheet while line spacing to mark the extent of line spacing, and means for controlling said lever operating means to lift the roller when the platen is operated by said rotating means.

13. In a machine for feeding a striped record sheet, a platen, printing devices, line spacing means, sheet feeding means for rotating said platen to insert said sheet, means for sensing said stripe, a platen, a paper table adjacent said platen, a relay, contacts in series with said relay, a paper lever on said table for operating said contacts when a sheet is placed on said table, means under control of said relay for making said platen rotating means and said stripe sensing means effective when said contacts are operated, and means under control of said sensing means for stopping said platen rotating means when the end of the stripe is sensed.

14. In a machine for printing and feeding a record sheet, printing devices, line spacing devices, means for marking a stripe on said sheet as printing and line spacing takes place, sheet feeding means for inserting said sheet, means for sensing the length of said stripe and stopping said feeding means to position the sheet in printing position when the end of said stripe is sensed, and means under control of said sensing means for initiating operation of said printing devices when the end of the stripe is sensed.

GOINO GHERTMAN.